Dec. 17, 1963 D. JACKSON 3,114,798

TELEVISION CAMERAS

Filed Oct. 29, 1959 2 Sheets-Sheet 1

Inventor
Donald Jackson
By [signature]
Attorneys

Inventor
Donald Jackson
By Holcombe, Wetherill & Brisebois
Attorneys

United States Patent Office 3,114,798
Patented Dec. 17, 1963

3,114,798

TELEVISION CAMERAS

Donald Jackson, Cambridge, England, assignor to Pye Limited, Cambridge, England, a company of Great Britain Filed Oct. 29, 1959, Ser. No. 849,542
Claims priority, application Great Britain Oct. 30, 1958
12 Claims. (Cl. 178—7.2)

Figure 1:
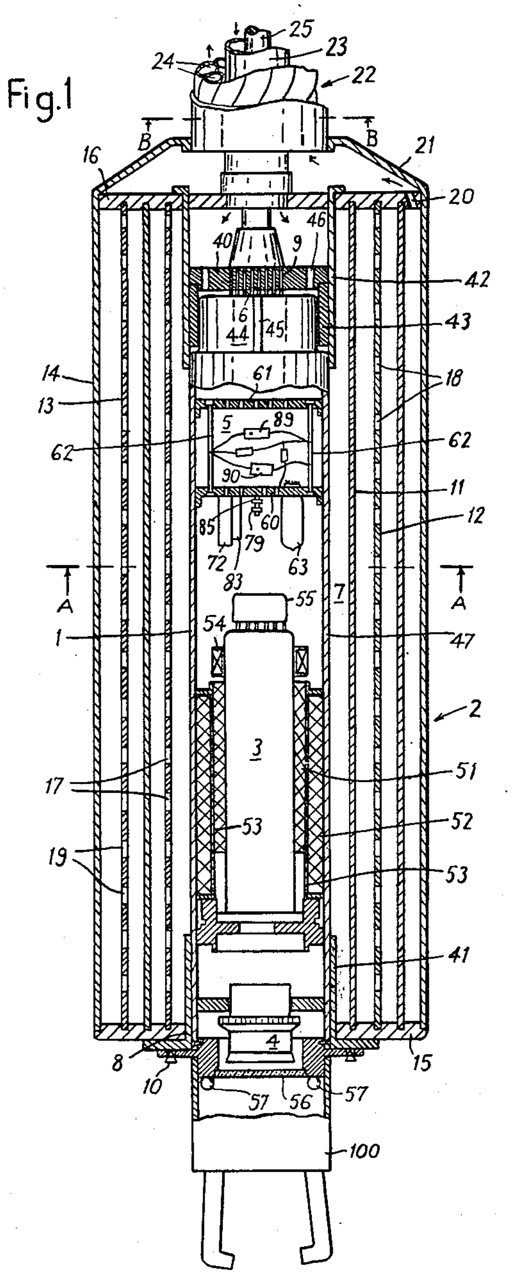

The present invention relates to television cameras which are intended for use within an atomic reactor or other environment subject to atomic or nuclear radiation. Where a television camera has to operate in a radioactive zone, it can only be handled by remote handling mechanism and the problem of servicing the camera is very difficult.

According to the present invention, a television pick-up tube together with its head amplifier and any ancillary beam focussing and deflecting components are assembled in an elongated preferably generally cylindrical, casing to form a camera unit or cartridge, the target of the pick-up tube facing towards an opening or lens at one end of the casing and the opposite end of the casing carrying contacts connected to the electrical components in the casing, the cartridge being adapted to fit into a tubular holder with its contacts engaging contacts within the holder and connected to a cable leading to a remotely positioned camera control unit.

The invention also consists in a television camera unit or cartridge comprising an elongated tubular casing containing a television pick-up tube and its associated head amplifier and beam deflecting means, the pick-up tube being arranged with its target facing towards a lens disposed at one end of the cartridge and the opposite end of the cartridge carrying a multi-contact pin and socket connector of which the contacts are connected to the components in the cartridge and are arranged to make connection with the contacts of a complementary connector in a tubular housing or holder when the cartridge is inserted therein by sliding movement in a direction parallel to its axis.

Springs, latches, turnbuckles or equivalent means may be provided for retaining the cartridge and holder assembled together.

By means of the invention, the working part of the television camera which is to be located within the radiation zone is constructed as a plug-in unit or cartridge which can be inserted into or removed from the holder connected to the camera control unit located outside the radiation zone whereby, in the event of a defect occurring in the camera cartridge, it is a simple matter to withdraw it from the holder by remote handling mechanism and to insert a replacement cartridge into the holder. The defective cartridge, can be destroyed, or, if repairable, can be serviced after it has been decontaminated and its radioactivity has fallen to a safe level. The provision of a smooth outer casing to the cartridge facilitates decontamination by wiping.

The camera cartridge contains the minimum number of components which it is essential should be located in the radiation zone, all other components being incorporated in the camera control unit located outside the radiation zone.

Preferably the holder comprises a housing through which cooling gas can be passed to protect the cartridge from high ambient temperatures.

When used in an atomic reactor the camera cartridge and its holder can be inserted into the pile by suspending it from a suitable winding mechanism located above the reactor. The holder may be suspended on a hose assembly through which cooling gas can be supplied to the housing. The housing may carry ancillary equipment such as mirrors, claws or grabs and the operating mechanisms therefor, or these accessories may be carried from the camera cartridge.

The camera cable can pass to the exterior of the reactor chamber through the hose supplying coolant to the housing. A coaxial arrangement may be used, the coolant gas flowing down the central tube and returning through the outer tube.

The lens end of the cartridge may be provided with a profiled shape whereby it may be easily gripped by suitable gripping means for withdrawing the cartridge from the holder, and for inserting a new cartridge, which operations can be performed within the reactor or an upper chamber thereof.

The casing of the cartridge may be completely sealed or may have openings therein through which cooling gas may be circulated. If desired, the casing can be provided with inlet and outlet valves which open automatically under the pressure of the applied cooling gas, but otherwise remain closed.

The cartridge may also be arranged to provide electrical outputs, for example by means of contact rings, plates or other connector members on its external surface, to feed other devices externally of the cartridge, for example mirror mechanisms or manipulators.

Figures 2, 3:
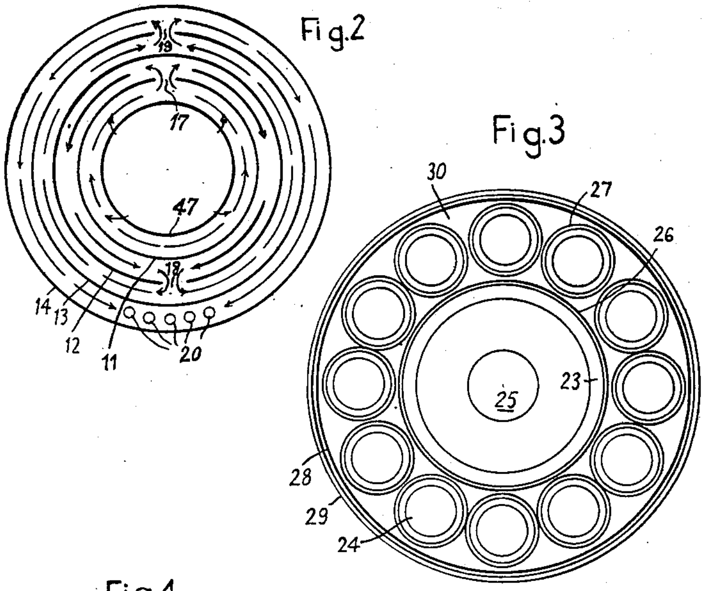
Figure 4:
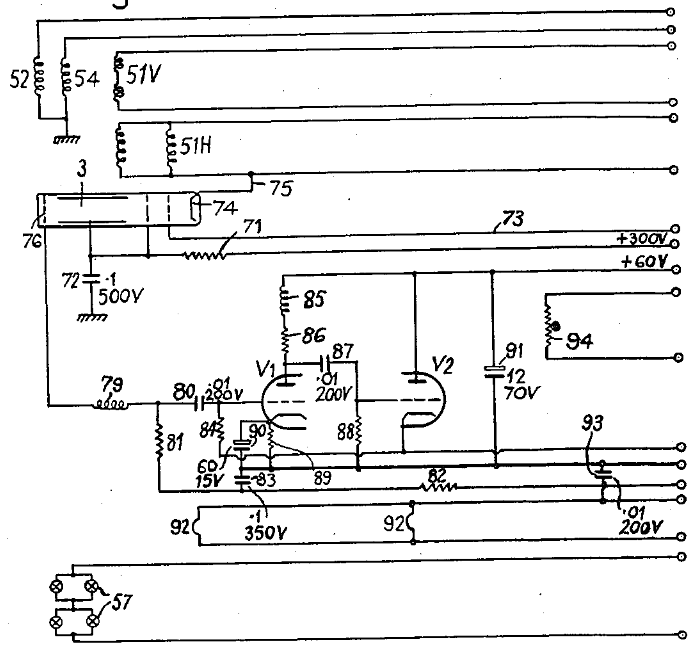

In order that the invention may be more clearly understood, reference will now be made to the accompanying drawings, in which:

FIGURE 1 is a longitudinal section of a television camera assembly for use in an atomic reactor, FIGURE 2 is a section along the line A—A in FIGURE 1, FIGURE 3 is a sectional along the line B—B in FIGURE 1, FIGURE 4 is a circuit diagram.

The television camera shown in the drawings is designed for operating within a gas-cooled atomic reactor and is constructed in the form of an elongated generally cylindrical unit or cartridge 1 adapted to be plugged into a holder 2 for the cartridge. The cartridge incorporates the pick-up tube 3 and only those components which must be located in close association with the pick-up tube, namely the camera lens 4, the beam controlling coils or electrodes associated with the tube, and its head amplifier 5. The lens 4 is arranged at one end of the cartridge, the other end of which is provided with electrical plug connections 6. The holder 2 has a tubular chamber 7 into which the cartridge 1 can be slid by endwise movement through an opening 8 in one end of the holder, the opposite end of the chamber being provided with an electrical socket connector 9 adapted to receive the plug connections 6 at the end of the cartridge when the latter is inserted in the holder. Latch means 10 may be provided for retaining the cartridge assembled in the holder.

In the embodiment shown, the holder comprises a housing comprising labyrinth passages through which a cooling gas may be circulated so that the housing constitutes a heat insulating buffer for protecting the cartridge from the high ambient temperatures existing in the reactor chamber. As shown, the housing comprises a plurality of concentric cylinders 11, 12, 13 and 14, preferably of stainless steel, which are held together at their ends by end plates 15 and 16 to define annular chambers between adjacent cylinders. The inner cylinder 11 is formed with a row of apertures 17 extending therealong in a line parallel to the axis of the housing. A similar row of apertures 18 is formed in the wall of the cylinder 12 in a position diametrically opposite to the row of apertures 17 in the cylinder 11, and the next cylinder 13 is formed with a row of apertures 19 in a position diametrically opposite to the row of apertures 18 in the cylinder 12. The outer cylinder 14 is imperforate and the end plate 16 is provided with a series of apertures 20 connecting with the outer annular chamber at a position approximately diametrically opposite to the row of apertures 19 provided in the cylinder 13. The end wall 16 is provided with a cover 21 having a central opening in which is fitted a hose assembly 22 consisting of a central tube 23 which is surrounded by a plurality of smaller tubes 24. The central tube serves for the admission of cooling gas and is connected to a central opening in the end plate 16 so that the cooling gas will be fed to the interior of the housing. The smaller tubes 24 connect with the chamber formed between the end cover 21 and the end plate 16 and form return flow passages for cooling gas which has passed through the labyrinth of annular chambers of the housing, in the manner indicated in FIGURE 2, and has been discharged through the apertures 20.

The hose assembly 22 serves for suspending the camera within the atomic pile and also as the means for lowering and withdrawing the camera. The hose may be moved from outside the reactor by any appropriate winding gear (not shown) and is provided at its end outside the reactor chamber with connections for the admission of cooling gas and for exhausting the gas flowing back through the tubes 24.

Within the central tube passes an electric cable 25 containing wires connecting with the socket contacts 9 to the camera control unit arranged outside the reactor.

The hose assembly 22 is preferably flexible and may be constructed as shown in FIGURE 3. The tube 23 conveniently comprises a spiral flexible metal hose which may be surrounded with a layer of heat-insulating material 26, such as a silica fibre. The tubes 24 which are also conveniently of spiral metal flexible construction, are arranged in helical fashion, around the tube 23. They may also be individually covered with heat-insulating material 27. The entire assembly is enclosed in a covering of heat-resistant material 28 and a covering 29 of wire braiding or metal sheathing to protect the hose assembly against physical damage. The spaces 30 between the tubes 24 may be packed with insulating material and may also accommodate lifting or supporting wires.

With the hose construction described the camera cable 25 and the cooling gas being supplied through the tube 23 are protected by the outer sheath of gas-filled tubes 24 and the heat-resistant layers from the high ambient temperature in the reactor. While the gas in the tubes 24 will be hotter than the gas in the inlet tube 23, it will not have the extremely high temperature of the surrounding atmosphere in the reactor.

The cartridge 1 is supported in the housing by the sleeve supports 41, 42 projecting inwardly from the end walls 15, 16 respectively. The sleeve 42 carries the partition 40 which incorporates the socket connector 9. Secured within the sleeve 42, inwardly of the partition 40, is an axially slotted ring 43 having an internal diameter adapted to receive the end cap 44 on the cartridge, the axially extending slot in this ring forming a keyway to receive a key 45 on the end cap 44 to ensure that the cartridge can only fit in the housing in that single position in which the plug pins 6 will engage their corresponding sockets in the connector 9.

The interior of the camera can be cooled by allowing the cooling gas entering through the tube 23, to pass, by way of the openings 46 in the partition 40 and openings in the end cap 44, into the interior of the cartridge, the casing wall 47 of which is provided with one or more slots or apertures through which the air may be discharged into the chamber 7 within the cylinder 11. The slots or apertures in the wall 47 of the cartridge may increase in width, diameter or number in the direction from the end cap 44 to the lens, so that the cooling gas will be caused to flow through the length of the cartridge.

Within the cartridge is located the pick-up tube 3 which is conveniently of the known photo-conductive type, its target being located directly behind the lens 4. Around the tube 3 are located the deflecting coils 51 and the focus coil 52 which may be wound on a suitable former 53, the external diameter of the end cheeks of which is such that it fits within the casing wall 47 to locate the former and the tube 3 centrally therein. The tube 3 is also provided with alignment coils 54 and the contact pins at the end of the tube are connected by a connecting socket 55 to the head amplifier unit generally indicated at 5. This head amplifier is conveniently assembled on a frame comprising a pair of end plates 60, 61 separated by spacers 62. One of the end plates 60 carries a valve holder for the valve 63 and also carries other components such as the condensers 72, 83 and the coils 79, 85. Other components of the amplifier may be located between the end plates.

At its front end the cartridge 1 is closed by a window 56. Electric lamps 57 are provided to illuminate the view seen by the lens 4.

The circuit of a suitable head amplifier is shown in FIGURE 4, which also shows the electrical connections from the pins of the plug 6 to the other components in the cartridge. The connections to the lamps 57, to the focus coil 52, the alignment coil 54, and the vertical deflection coils 51V and the horizontal deflection coils 51H are clear without further explanation. The pick-up tube 3 has its anode connected to +300 volts supply via the resistor 71 and is de-coupled to earth by the capacitor 72. The beam control voltage and vertical blanking pulses are fed to the grid through the conductor 73. Horizontal blanking pulses are derived from the voltage waveform across the horizontal deflection coils 51H and applied to the cathode 74 of the tube 3 by the conductor 75. The pick-up tube therefore acts as its own mixer for the vertical and horizontal blanking pulses. The signal output from the target 76 is fed to the head amplifier which comprises a two-stage resistance coupled amplifier with a cathode follower output.

The output from the target is fed to the grid of the first triode V1 via the compensating coil 79 and the condenser 80. The resistors 81 and 84 constitute the target load resistance and the target D.C. voltage is supplied via resistor 82 de-coupled to ground by the condenser 83. The grid of V1 is connected to the cathode of V2 via the resistor 84. The compensating coil 85 and the anode load resistor 86 are connected in the anode supply to V1, which anode is connected through the condenser 87 to the grid of V2 which is connected to ground by the resistor 88. The biasing resistor 89 connected in the cathode lead of V1 is shunted by the electrolytic condenser 90. The anode of V2 is directly connected to the H.T. supply which is connected to ground by the electrolytic condenser 91. The cathode heaters are indicated at 92 and are de-coupled to ground by the condenser 93.

A suitable double-triode valve for the amplifier described is the valve type E88CC manufactured by the Mullard Radio Valve Company Limited.

By connecting the grid return of V1 to the cathode of V2 a higher value of the cathode biasing resistor 89 is permitted, thus permitting D.C. stabilization of the working point of V1. This direct connection from the cathode of V2 to the grid return of V1 also automatically provides negative feedback to reduce the input impedance of the amplifier. This novel connection provides these advantages without additional components being necessary.

The cartridge may also incorporate a temperature-responsive resistor 94 for giving an indication outside the reactor of the temperature within the cartridge.

The materials and components used in the construction of the television camera are selected so that they have a low magnitude of induced radioactivity and are sufficiently resistant to radiation damage to permit a useful operating life under the high radiation conditions existing in an atomic reactor. The following are the preferred selections for the camera described.

The camera lens is made from stabilised glass. The pick-up tube has its front face made of stabilised glass, fused quartz glass or synthetic sapphire. The rest of the tube envelope may be of normal glass but the glass should be free of boron. The envelope of the valve in the head amplifier should be made of glass which is boron-free, or of metal.

The wires and conductors used are, as far as possible, made of aluminium, preferably pure aluminium, and the wires are joined by aluminium soldering. The focus and deflection coils are wound of aluminium wire, which is anodised to provide insulation between the turns. The focus coil former may be made of aluminium with its surface anodised, in which case it should be slotted to avoid producing a short-circuited turn. Alternatively the former may be made of a ceramic of "Tufnol." The compensating coils are wound of anodised aluminium wire on a ceramic former.

The electrolytic condensers 90, 91 have tantalum electrodes and the other condensers may have aluminium electrodes with paper or ceramic dielectrics. The resistances are preferably wire wound. Specifically, the resistances 81, 82, 84 and 88 comprise a metal film on fibre glass wound on a ceramic former. Such resistances are commercially available under the trade name Fiberloy. The resistances 71, 86 and 89 are wound with nickel-chrome wire on ceramic formers.

The structural members of the cartridge are made of aluminium or a ceramic. The outer sheathing of the cartridge is also made of aluminium. The lamps used for illuminating are also preferably provided with aluminium caps. Any insulation sleeving provided on the conductors is preferably of silica fibre or polythene.

Tantalum electrolytic condensers as at present commercially manufactured are fitted with a gasket of polytetrafluoroethylene which suffers from radiation damage. In order to reinforce the mechanical strength of the tantalum electrolytic condensers, they are each embedded in a mass of an epoxy resin, such as the resin known under the registered trademark Araldite. The resin mass within which the condenser is embedded is provided with a small vent hole to vent any gassing of the electrolyte or the polytetrafluoroethylene gasket.

The end of the camera cartridge may be provided with auxiliary devices such as reflecting mirrors, which may be retractable or adjustable, for enabling the camera to see in directions transverse to its axis, or claws, grabs or other tools for enabling various operations to be performed inside the reactor and within the view of the camera. In the drawing such an attachment comprising mechanical grabs 100 is diagrammatically illustrated. These grabs may be remotely actuated by flexible cables or pneumatic or electric motors incorporated in the camera cartridge or the attachment device, the controls passing outside the atomic reactor through the hose assembly.

Alternatively the mirrors, grabs, claws, lights or other attachments may be carried by the housing 2, in which case any control motors may be incorporated in the housing. Any electrical connection required between the camera cable and the accessories may be effected by means of contact rings or equivalent connecting devices provided on the external surface of the cartridge.

When the camera cartridge becomes unserviceable for any reason, it may easily be withdrawn from the housing by means of any appropriate remotely controlled manipulator and delivered, for example by a chute, to an appropriate place for decontamination or destruction. In view of the fact that the components of the cartridge possess a short half-life, it becomes practical for a defective camera unit to be serviced after an appropriate time.

While a particular embodiment has been described it will be understood that various modifications may be made without departing from the scope of the invention. Thus, for example, a pick-up tube employing electrostatic deflection and/or focussing may be employed. The construction of the housing can also be modified by providing more or less annular chambers or alternative heat insulating means, depending upon the ambient temperature encountered. The hose assembly can also be modified and the plurality of outer tubes for the return flow of gas can be replaced by a single outer tube which surrounds the central tube. The smaller tubes 24 of the hose assembly need not all be used for the return flow of cooling gas; some of them may be employed for conveying gas under pressure for operating controls on the camera or housing. Further, in order to cool external parts of the apparatus or the accessories, openings may be provided in the housing through which cooling gas may be discharged on to the part to be cooled.

The sheathing 47 of the cartridge can comprise an aluminium tube, or may be constructed of two semi-cylindrical covers assembled together. The components may be assembled to one cover and the other cover be removable for servicing. Although it is preferred to enclose the camera components in a sheathing, this is not essential and the camera components can be assembled together on an open framework.

I claim:

1. A television camera including a camera unit comprising an elongated casing containing a television pick-up tube and associated head amplifier and beam focussing and deflecting means, the pick-up tube being arranged with its target facing towards one end of the casing through which light can pass and the opposite end of the casing carrying one element of a multi-contact pin and socket connector of which the contacts are connected to the components in the casing, and a holder for the camera unit, said holder having a tube-like cavity with an open outer end into which the camera unit is inserted from said open end of said cavity, and having the complementary element of the multi-contact pin and socket connector arranged at the inner end of said cavity and adapted to receive and make contact with the contacts of the multi-contact connector on the end of the casing when the camera unit is inserted into the holder by a sliding movement in a direction parallel to its longitudinal axis.

2. A television camera unit as claimed in claim 1, wherein the casing is of generally cylindrical shape.

3. Television apparatus as claimed in claim 1, wherein the holder comprises a housing having a central chamber adapted to receive the camera unit, said central chamber being surrounded by a plurality of annular chambers which are connected together by openings through the wall of the chambers to permit a cooling gas to be circulated therethrough.

4. Apparatus as claimed in claim 3, wherein the openings in the walls of adjacent chambers are arranged so as to lie substantially diametrically opposite to each other.

5. Apparatus as claimed in claim 3, wherein the cooling gas is admitted to the central chamber of the housing and is circulated through the annular chambers in turn from the innermost to the outermost chamber.

6. Apparatus as claimed in claim 5, wherein the cooling gas is supplied to the housing through a flexible hose comprising a central tube which connects with the central chamber of the housing and at least one tube disposed outside said central tube and connected to said outermost chamber for the return flow of gas.

7. Apparatus as claimed in claim 6, wherein said outer hose is disposed concentrically with and completely surrounds the central tube.

8. Apparatus as claimed in claim 6, wherein a plurality of tubes of smaller diameter than the central tube are arranged to surround the central tube.

9. Apparatus as claimed in claim 8, wherein the camera cable which connects with the contacts in the housing extends through the central tube of the hose.

10. A flexible hose assembly for supplying cooling gas to a television camera, comprising a central spiral flexible metallic hose, a covering of heat-resistant material over said central hose, a plurality of further spiral flexible metallic hoses of smaller diameter than said central hose, said further hoses also having a covering of heat-resistant material and being assembled in helical fashion around the exterior of the heat resistant covering of the central hose, an outer covering of heat-resistant material surrounding the assembly of said further tubes, and an external covering of wire braiding surrounding said outer covering of heat-resistant material.

11. A television camera comprising in combination a housing comprising a plurality of tubular elements surrounding one another in spaced relationship to form a number of annular chambers, each element having at least one opening connecting adjacent chambers together, a camera unit comprising an elongated casing adapted to fit within the central tubular element of said housing, said casing containing a television pick-up tube and associated beam focussing and deflecting means and a head amplifier for said pick-up tube, the pick-up tube being arranged with its target facing towards a lens disposed at one end of the casing and the opposite end of the casing carrying a multi-contact pin and socket connector adapted to be releasably connected by a sliding movement of the casing in a direction parallel to the longitudinal axis of the casing and the housing with a complementary multi-contact pin and socket connector mounted at the inner end of the central tubular element of the housing, electrical connections between the components in the casing and the contacts of the connector mounted at the end of the casing, a flexible hose assembly secured to the end of the housing opposite to that which the lens faces, said hose assembly comprising a central hose the bore of which connects with the central chamber of the housing defined by the central tubular element and a plurality of smaller hoses assembled around the periphery of said central hose, at least some of said smaller hoses connecting with the outer annular chamber of the housing, heat-resistant material enclosing the hose assembly, and an electric cable extending through the bore of the central hose and having its conductors connected with the contacts of the multi-contact connector mounted at the inner end of the central tubular member of the housing.

12. Apparatus as claimed in claim 11, wherein the lens is provided with a profiled shape for enabling the camera unit to be gripped by remote handling means for withdrawing the camera unit from the holder.

References Cited in the file of this patent

UNITED STATES PATENTS

| | | |
|---|---|---|
| 1,876,103 | Trogner | Sept. 6, 1932 |
| 2,011,647 | Mouromtseff | Aug. 20, 1935 |
| 2,235,669 | Conklin | Mar. 18, 1941 |
| 2,578,280 | Barnard | Dec. 11, 1951 |
| 2,849,530 | Fleet | Aug. 26, 1958 |
| 2,852,600 | Jenkins | Sept. 16, 1958 |

OTHER REFERENCES

Publication: "Closed Circuit Television Systems," RCA Service Co. Copyright 1958, Addenda Sec. 2–42 and 2–43; Addenda, pp. 15 to 18.